United States Patent [19]

Mizuno et al.

[11] 4,447,702

[45] May 8, 1984

[54] DC ARC WELDING APPARATUS HAVING VARIABLE CURRENT RESPONSE

[75] Inventors: Takaji Mizuno; Hiroshi Suwahara; Hirohisa Segawa, all of Aichi, Japan

[73] Assignee: Mitsubishi Denki Kabushiki Kaisha, Tokyo, Japan

[21] Appl. No.: 407,408

[22] Filed: Aug. 12, 1982

[30] Foreign Application Priority Data

Aug. 12, 1981 [JP] Japan ............................. 56-126496

[51] Int. Cl.³ .............................................. B23K 9/10
[52] U.S. Cl. ........................... 219/130.33; 219/130.51
[58] Field of Search ..................... 219/130.33, 130.21, 219/130.51

[56] References Cited

U.S. PATENT DOCUMENTS

| | | | |
|---|---|---|---|
| 3,792,225 | 2/1974 | Needham et al. | 219/130.21 |
| 4,201,906 | 5/1980 | Puschner | 219/130.33 |
| 4,349,720 | 9/1982 | Mäkimaa | 219/130.33 |

*Primary Examiner*—C. C. Shaw
*Attorney, Agent, or Firm*—Sughrue, Mion, Zinn, Macpeak and Seas

[57] ABSTRACT

A welding apparatus is made capable of avoiding the occurrence of welding wire spattering following a short circuit, for example, by providing an arithmetic circuit having a plurality of selectively operated delay elements which smooth the response to a rapid change in welding conditions.

5 Claims, 4 Drawing Figures

DC ARC WELDING APPARATUS HAVING VARIABLE CURRENT RESPONSE

BACKGROUND OF THE INVENTION

This invention relates to a DC arc welding apparatus. More particularly, the invention relates to a DC arc welding apparatus provided with a control circuit capable of controlling the rise of the welding current.

One DC arc welding apparatus of this type is shown in FIG. 1, wherein reference numeral 1 designates a DC power source including a welding transformer, 2 is a switching element for controlling the output current of the power source 1, 3 and 4 are the output terminals of the welding apparatus, 5 is a contact chip and 6 is a consumable welding electrode (hereinafter referred to as "the wire") to which electric power is supplied through the contact chip 5. The material 8 to be welded (hereinafter referred to as "the base metal") is connected to the output terminal 4, and arcs 7 are established between the wire 6 and the base metal 8. A current detecting element 9 such as a shunt resistor is coupled to an output current control circuit 17 for controlling the output signal of the detecting element 9 in accordance with the output of an arithmetic circuit 11. The arithmetic circuit 11 is constituted by an operational amplifier 12, a resistor 13 coupled between an inverted terminal of the amplifier 12 and an output voltage setting circuit 10 such as a variable resistor, a resistor 14 coupled between the output terminal 3 and the inverted input terminal of the amplifier 12, a resistor 15 coupled between an output terminal of the amplifier 12 and the inverted input terminal thereof and a capacitor 16 coupled in parallel with the resistor 15. Reference numeral 18 denotes a drive circuit for amplifying the output of the control circuit 17 and controlling the on-off operation of the switching element 12.

The operation of this DC arc welding apparatus shown in FIG. 1 will now be described.

An output voltage set signal $e_s$ of the output voltage setting device 10 and an output voltage feedback signal $e_{vf}$ are subjected to comparison and amplification in the amplifier 12. The output signal $e_{vo}$ of the arithmetic circuit 12 and the output current signal $e_{if}$ of the output current detecting element 9 are processed in the output current control circuit 17 to produce a signal $e_{io}$ which is applied to the following drive circuit 18 so that the signal $e_{if}$ corresponding to the output signal $e_{vo}$ is always obtainable. The drive circuit 18 operates to drive the switching element 2 in response to the above described signal $e_{io}$. When the switching element 2 is repeatedly rendered conductive (ON) and non-conductive (OFF), current flows, in order, from the DC power circuit 1 through the switching element 2, the output terminal 3, the contact chip 5, the wire 6, the arc 7, the base metal 8, the output terminal 4 and the output current detecting element 9 back to the DC power circuit. The above output current is fed-back to the output current control circuit 17 by the output current detecting element 9 as an output current signal $e_{if}$. In this circuit, the output current set signal is the output signal $e_{vo}$ of the arithmetic circuit 11. The output current set signal $e_{vo}$ is determined so that the output voltage feedback signal $e_{vf}$ is made constant irrespective of the arc condition (the output voltage set signal $e_s$ being constant). Therefore, the voltage between the output terminals 3 and 4 is constant regardless of the load therebetween. However, upon the occurrence of a short-circuit between the wire 6 and the base metal 8, if the control circuit operates to supply a large current in the wire 6 momentarily to thereby make the voltage therebetween constant, a current larger than that required flows in the wire 6. This causes the wire to melt partially and spread in all directions (hereinafter referred to as "spattering"). Due to such spattering, the distance between the wire 6 and the base metal 8 immediately after the short-circuit is removed (hereinafter referred to as the arc length) becomes long resulting in an unstable arc condition including the extinction of the arc. Further, the spattered metal may adhere to the base metal 8, and it is difficult to remove the same. Consequently, a time delay element such as a capacitor 16 is provided in the arithmetic circuit 11 so that the output signal $e_{vo}$ varies with the delay time in response to an abrupt variation of the output voltage feedback signal $e_{vf}$. As a result, the output current is not increased abruptly but rather gradually in response to the formation of the short-circuit between the wire 6 and the base metal 8. Shown in FIG. 2 are the relations among the output voltage feedback signal $e_{vf}$, the output voltage setting signal $e_s$, the output signal $e_{vo}$ and the output current I. The above described apparatus is more fully described in co-pending application Ser. No. 401,774, filed July 26, 1982, and examples of the output current control circuit 17 and the drive circuit 18 are also described in detail therein.

It is considered that if the variation rate of the output current in the case of a short-circuit between the wire 6 and the base metal 8 is determined so that the rate in a small current range is larger than that in a large current range, a stable arc condition is obtainable over the entire operating range and spatters hardly occur. However, with the apparatus described above, since the variation rate is made constant, if the capacitor 16 is provided to make the arc stable in the small current region, a large quantity of spatters may occur in the large current region. On the other hand, if the capacitor 16 is provided to make the arc stable in the large current region, the arc condition may become unstable in the small current region.

SUMMARY OF THE INVENTION

Accordingly, it is an object of the present invention to eliminate the above described drawbacks. Another object of the invention is to provide a DC arc welding apparatus capable of carrying out a stable welding operation without the generation of spatters, over a wide current range.

A further object of the invention is to provide a DC arc welding apparatus capable of automatically changing the rise characteristic of the welding output current at a desired time.

The above objects, as well as other objects, are accomplished by the provision of a DC arc welding apparatus including a DC power source for supplying current between a welding electrode and a material to be welded via a switching element, an operational amplifier for comparing a feedback voltage detected across the welding electrode and the material to be welded with a predetermined voltage, to provide a difference signal, an arithmetic circuit having a plurality of delay elements selectively operated in response to an output signal of the said operational amplifier, a current detector for detecting the current flowing between the welding electrode and the material to be welded, an output current control circuit for subjecting the current detected by the current detecting means and an output of said arithmetic circuit corresponding to a predetermined current to comparison to derive a control signal, and a drive circuit for the switching element, the drive circuit being responsive to the control signal to control the ON-OFF operation of the switching element.

DETAILED DESCRIPTION OF THE PREFERRED EMBODIMENTS

Figure 1:
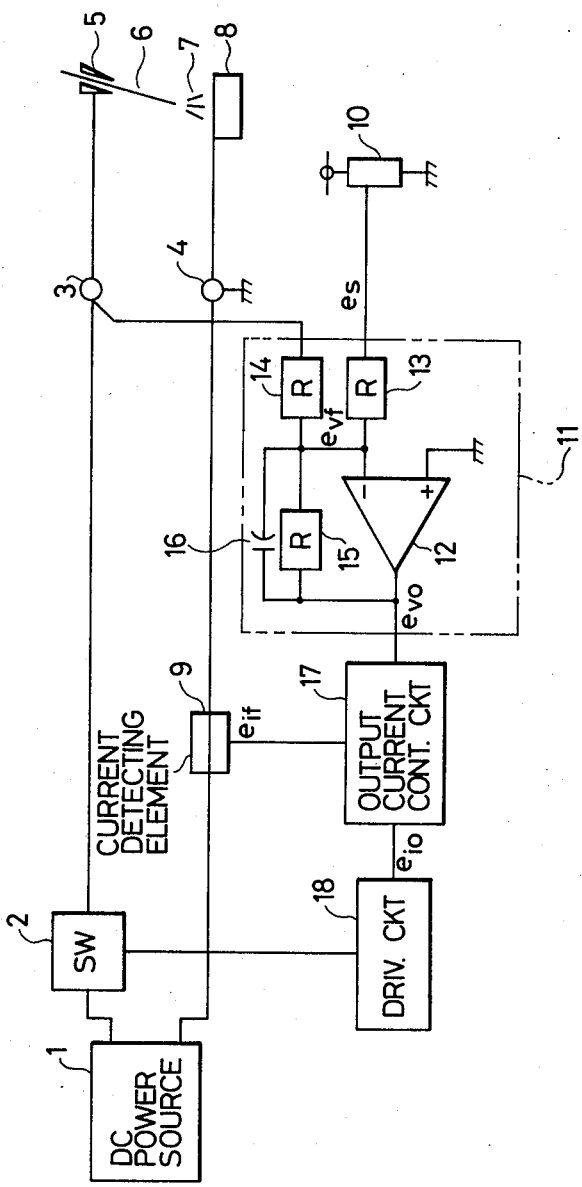
FIG. 1 is a block diagram showing a comparative example of a DC arc welding apparatus.
Figure 2:
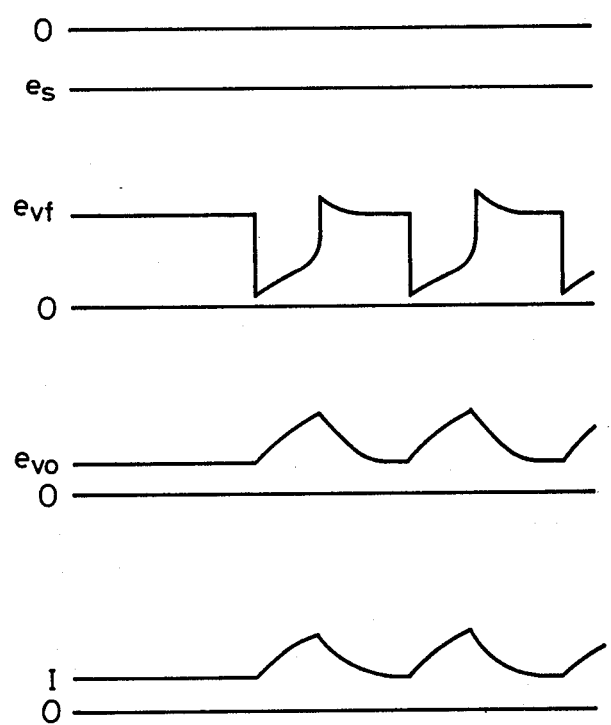
FIG. 2 is a diagram showing the relation among an output voltage set signal $e_s$, an output voltage feedback signal $e_{yf}$, an output signal $e_{wo}$ and an output current I of the device of FIG. 1.
Figure 3:
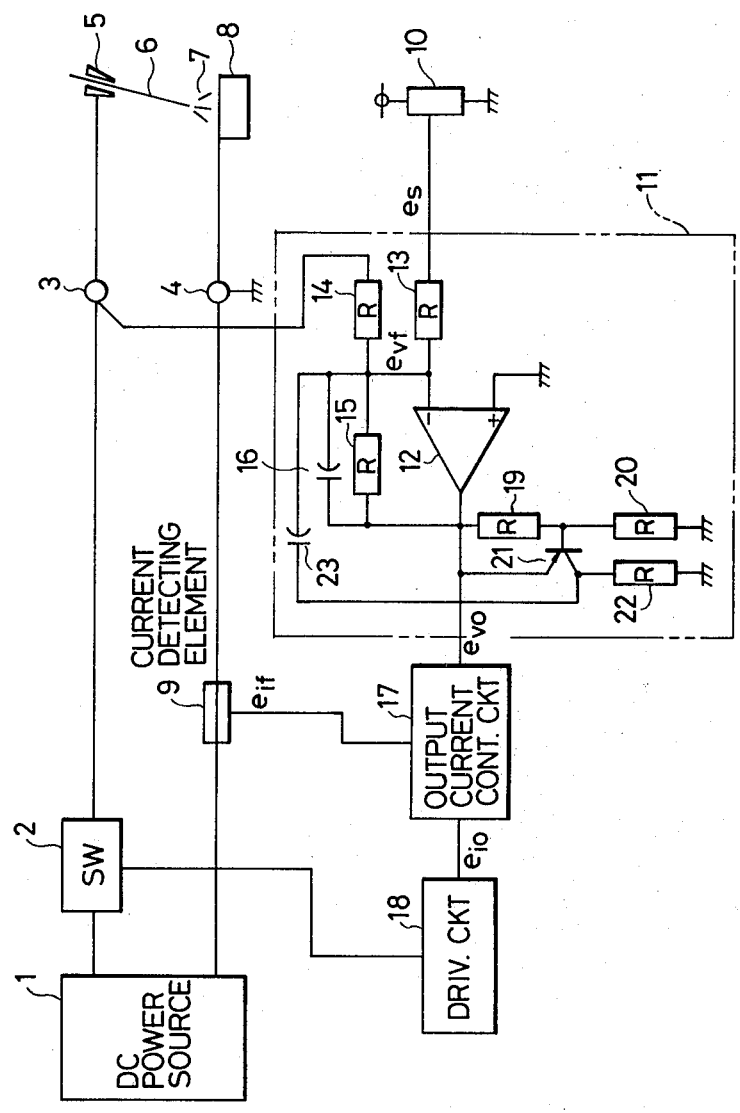
FIG. 3 is a block diagram showing a preferred embodiment of the present invention.

A first preferred embodiment of a DC arc welding apparatus according to this invention is shown in FIG. 3, wherein those components which have been previously described with reference to FIG. 1 are similarly numbered. In addition, reference numerals 19 and 20 denote resistors which constitute a series circuit between the output terminal of the amplifier 12 and ground, and reference numeral 21 designates a transistor having a base terminal coupled to the junction between the resistors 19 and 20, an emitter terminal coupled to the output of the amplifier 12 and a collector terminal coupled through a resistor 22 to ground. A capacitor 23 is connected between the inverted input terminal of the amplifier 12 and the collector terminal of the transistor 21.

The operation of the apparatus shown in FIG. 3 will now be described. In the circuit of FIG. 3, the output signal $e_{wo}$ is larger than zero. As the output signal $e_{wo}$ increases, the output current I is also increased. In the case when the output signal $e_{wo}$ is relatively small (the output current I being relatively small), the voltage appearing across the resistor 19 is smaller than that sufficient to render the transistor 21 conductive, and the transistor 21 is thus maintained non-conductive. Then, with a delay time determined by the capacitor 16, the arithmetic circuit 11 operates to meet an abrupt variation in the output voltage feedback signal $e_{yf}$. As a result, the rise characteristic of the output current exhibits a relatively sharp variation. On the other hand, when the output signal $e_{wo}$ is relatively large (the output current I being relatively large), the voltage across the resistor 19 becomes larger than that sufficient to render the transistor 21 conductive, and therefore the transistor 21 is made conductive. Upon the occurrence of this conductive state, the capacitor 23 is coupled in parallel with the capacitor 16. Accordingly, the arithmetic circuit 11 operates to respond to the abrupt variation in the output voltage feedback signal $e_{yf}$ with a delay time determined by the condensers 16 and 23. As a result, the rise characteristic of the output current I exhibits a relatively gentle variation. As described above, by adjusting the resistance ratio of the resistors 19 and 20 to a desired value, the rise characteristic of the output current may be varied to a desired point. Hence, a stable welding operation in which the amount of spattering is small is possible over a wide current range.

Figure 4:
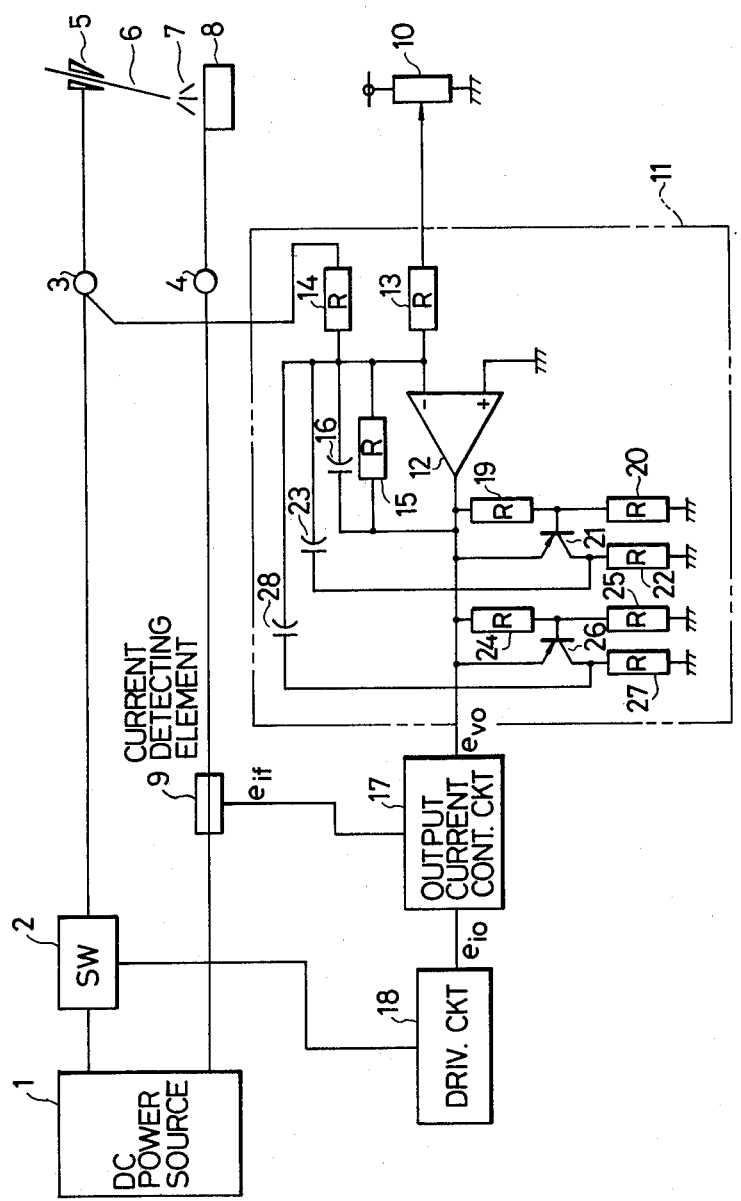
FIG. 4 is a block diagram showing another preferred embodiment of the present invention.

Although the rise characteristic of the output current is changed only once in the above described embodiment, as shown in FIG. 4, the rise characteristic thereof may be changed plural times by providing additional transistors such as 26 along with associated resistors 24, 25, 27 and capacitors 28.

Further, while the above embodiment employs a PNP type transistor, a similar function can be obtained by use of a switching element such as an FET.

As is clear from the above, according to the present invention, the delay time of the arithmetic circuit 11 varies in response to the variation of an output current, so that the rise characteristic of the output current is adjusted to an appropriate value with respect to the output current. Consequently, a stable welding operation in which spatters occur infrequently is possible over the entire welding current range.

What is claimed is:

1. A DC welding apparatus, comprising:
    a DC power source for supplying current between a welding electrode and a material to be welded via a switching element;
    means for comparing a feedback voltage detected across said welding electrode and said material to be welded with a predetermined voltage, to provide a difference signal;
    circuit means having a plurality of delay elements selectively operated in response to an output signal of said comparing means;
    current detecting means for detecting a current flowing between said welding electrode and said material to be welded;
    an output current control circuit for subjecting a current detected by said current detecting means and an output of said circuit means corresponding to a predetermined current to comparison to derive a control signal; and
    driving means responsive to said control signal for driving said switching element.

2. A welding apparatus as claimed in claim 1, wherein said circuit means and comparing means comprise an arithmetic circuit, and said comparing means includes an operational amplifier.

3. A welding apparatus as claimed in claim 2, said arithmetic circuit including switching means for selectively operating one or more of said delay elements.

4. A welding apparatus as claimed in claim 3, wherein said delay elements comprise capacitors coupled to an input of said operational amplifier, said capacitors being selectively coupled in parallel with one another to response to the operation of said switching means.

5. A welding apparatus as claimed in claims 3 or 4, wherein said switching means comprises transistors coupled to said delay elements.

* * * * *